United States Patent

[11] 3,630,313

[72] Inventor Cloyd D. Smith
 14928 La Cumbre Drive, Pacific, Calif. 90272
[21] Appl. No. 874,259
[22] Filed Nov. 5, 1969
[45] Patented Dec. 28, 1971

[54] NOISE SUPPRESSOR SYSTEM
 10 Claims, 15 Drawing Figs.
[52] U.S. Cl. .................................................. 181/33 HB,
 181/33 HC, 181/33 K
[51] Int. Cl. ..................................................... B64f 1/26,
 F01n 1/14
[50] Field of Search .......................................... 181/33,
 33.4, 33.22, 33.221, 33.222, 33.223, 43, 51

[56] References Cited
 UNITED STATES PATENTS

| | | | |
|---|---|---|---|
| 2,674,335 | 4/1954 | Lemmerman | 181/33 (.22) |
| 2,685,936 | 8/1954 | Brenneman et al. | 181/33 (.22) |
| 2,798,743 | 7/1957 | Olesten | 181/33 (.221) |
| 2,942,682 | 6/1960 | Bergh et al. | 181/33 (.22) |
| 3,011,584 | 12/1961 | Lemmerman et al. | 181/33 (.22) |
| 3,067,968 | 12/1962 | Heppenstall | 181/33 (.221) |
| 3,187,835 | 6/1965 | Smith | 181/33 (.222) |
| 3,196,977 | 7/1965 | Sanders | 181/33 (.22) |
| 3,395,774 | 8/1968 | Seifert | 181/33 (.4) |

FOREIGN PATENTS

| | | | |
|---|---|---|---|
| 667,068 | 8/1965 | Belgium | 181/33 (.22) |
| 1,185,236 | 2/1959 | France | 181/33 (.22) |
| 774,550 | 5/1957 | Great Britain | 181/33 (.221) |
| 847,482 | 9/1960 | Great Britain | 181/33 (.22) |
| 450,063 | 4/1968 | Switzerland | 181/33 (.22) |

*Primary Examiner*—Robert S. Ward, Jr.
*Attorney*—Forrest J. Lilly

ABSTRACT: A noise suppressor is provided for test stands for jet engine powered aircraft. The system is designed to silence the exhaust gases by removing energy from them quickly, and to this end provides for cooling, both by the addition of secondary air and by water sprays. Greater efficiency in reducing the surrounding sound level is attained by introducing a portion of the aircraft into the suppressor enclosure, means being provided to engage the airplane forwardly of the engine and rearwardly of the airplane wings.

PATENTED DEC 28 1971
3,630,313
SHEET 1 OF 7
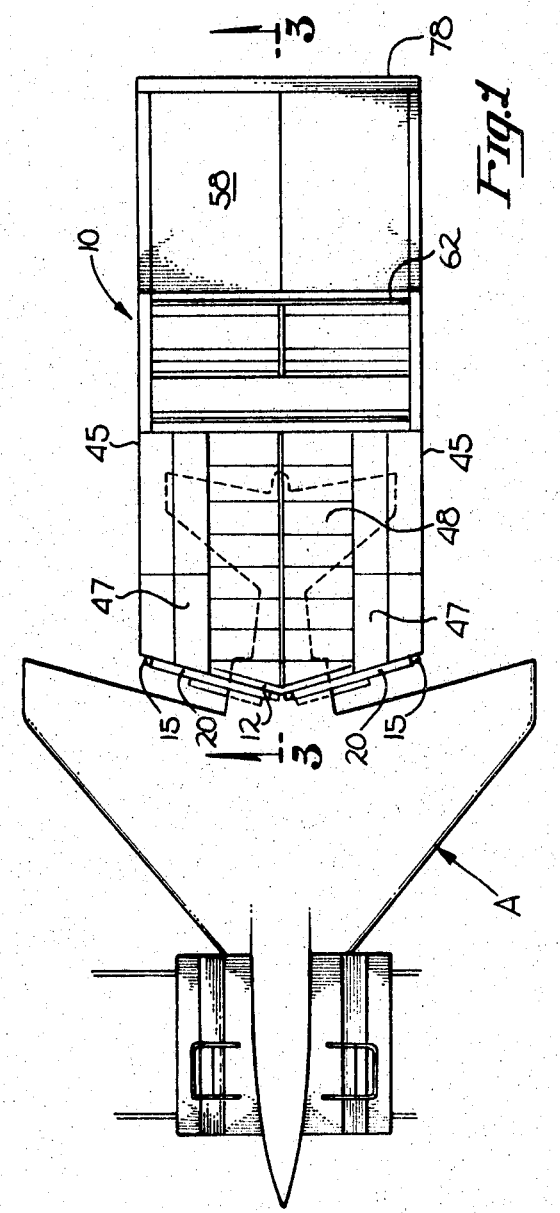
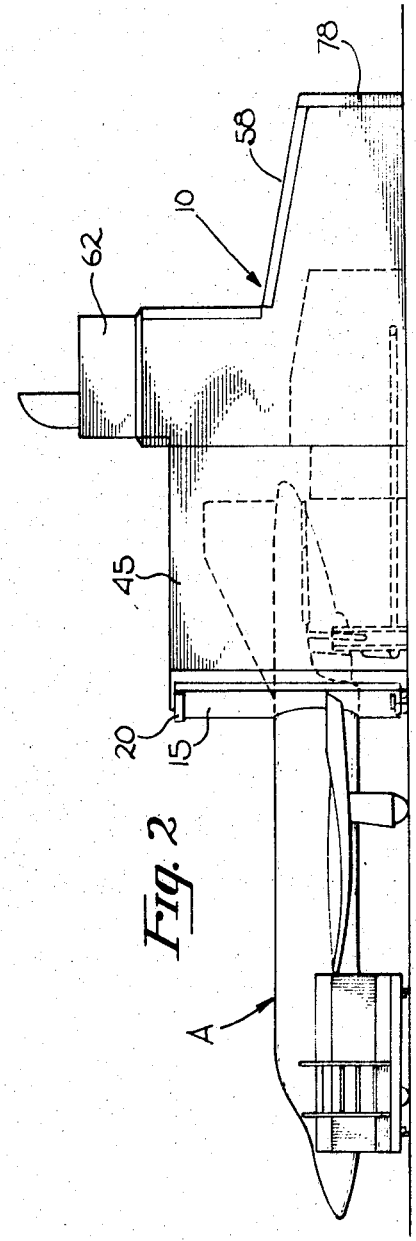
CLOYD D. SMITH
INVENTOR.
BY *Forrest J. Lilly*
ATTORNEY

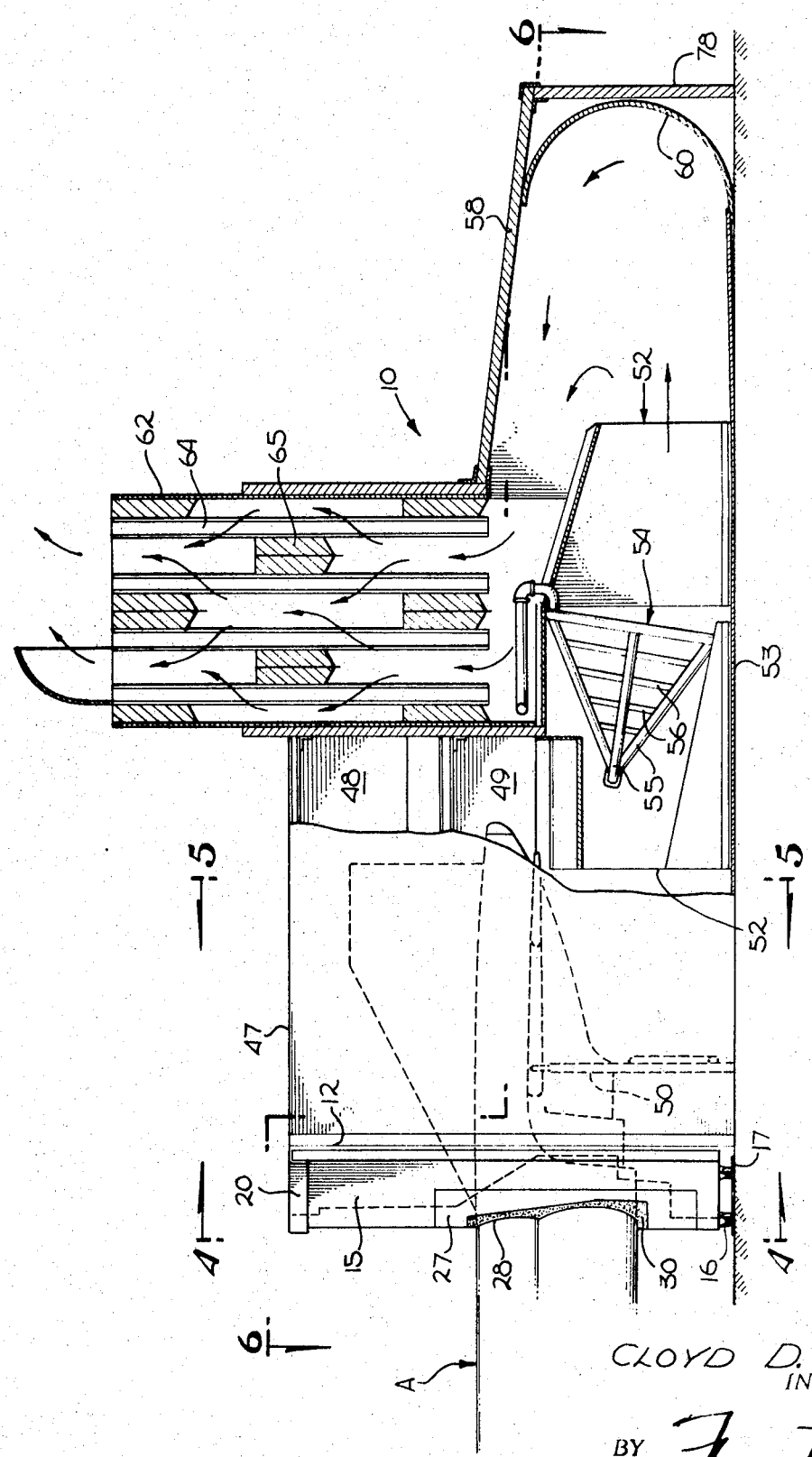

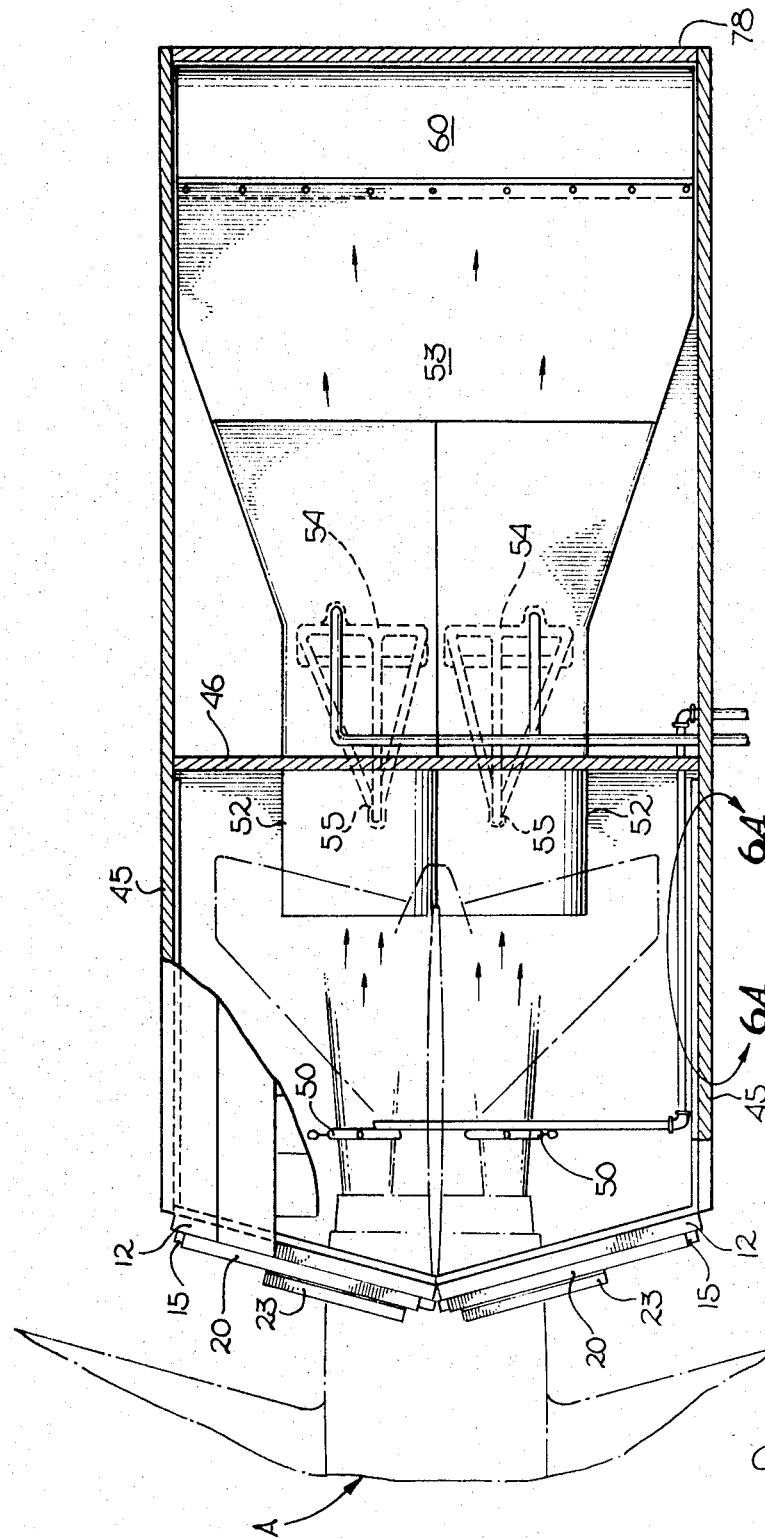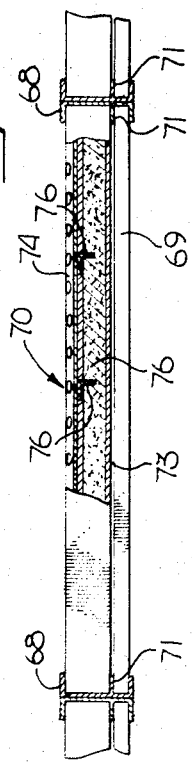
CLOYD D. SMITH
INVENTOR.
BY *[signature]*
ATTORNEY

CLOYD D. SMITH
INVENTOR.

BY
ATTORNEY

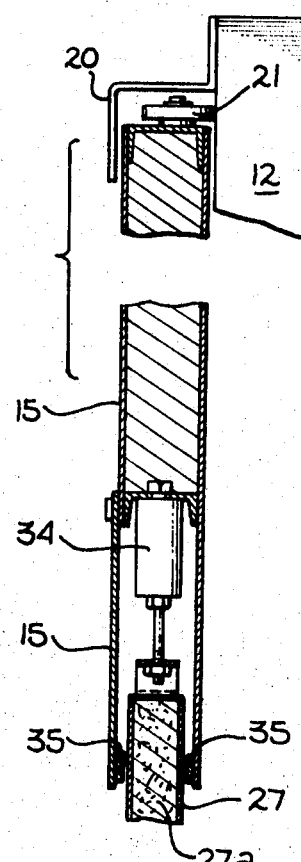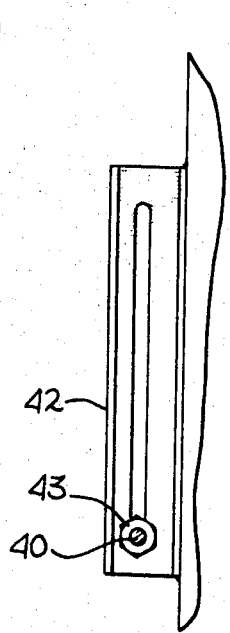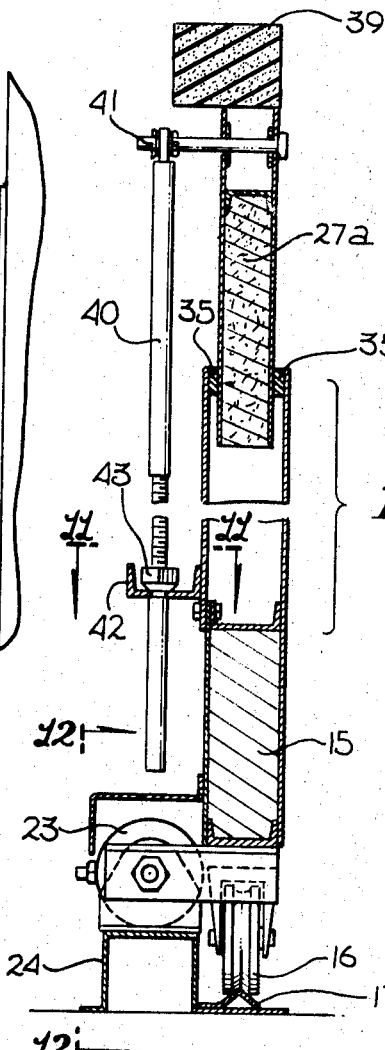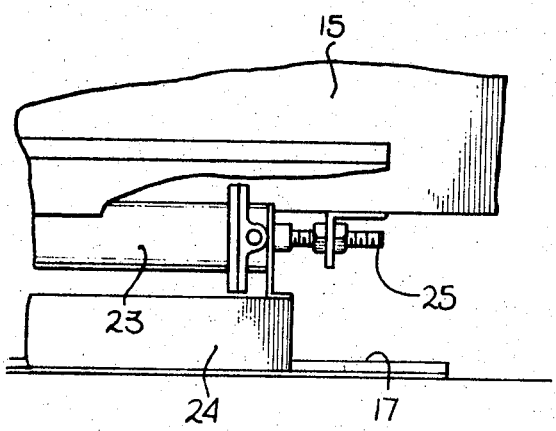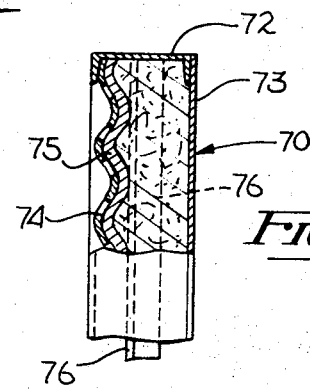

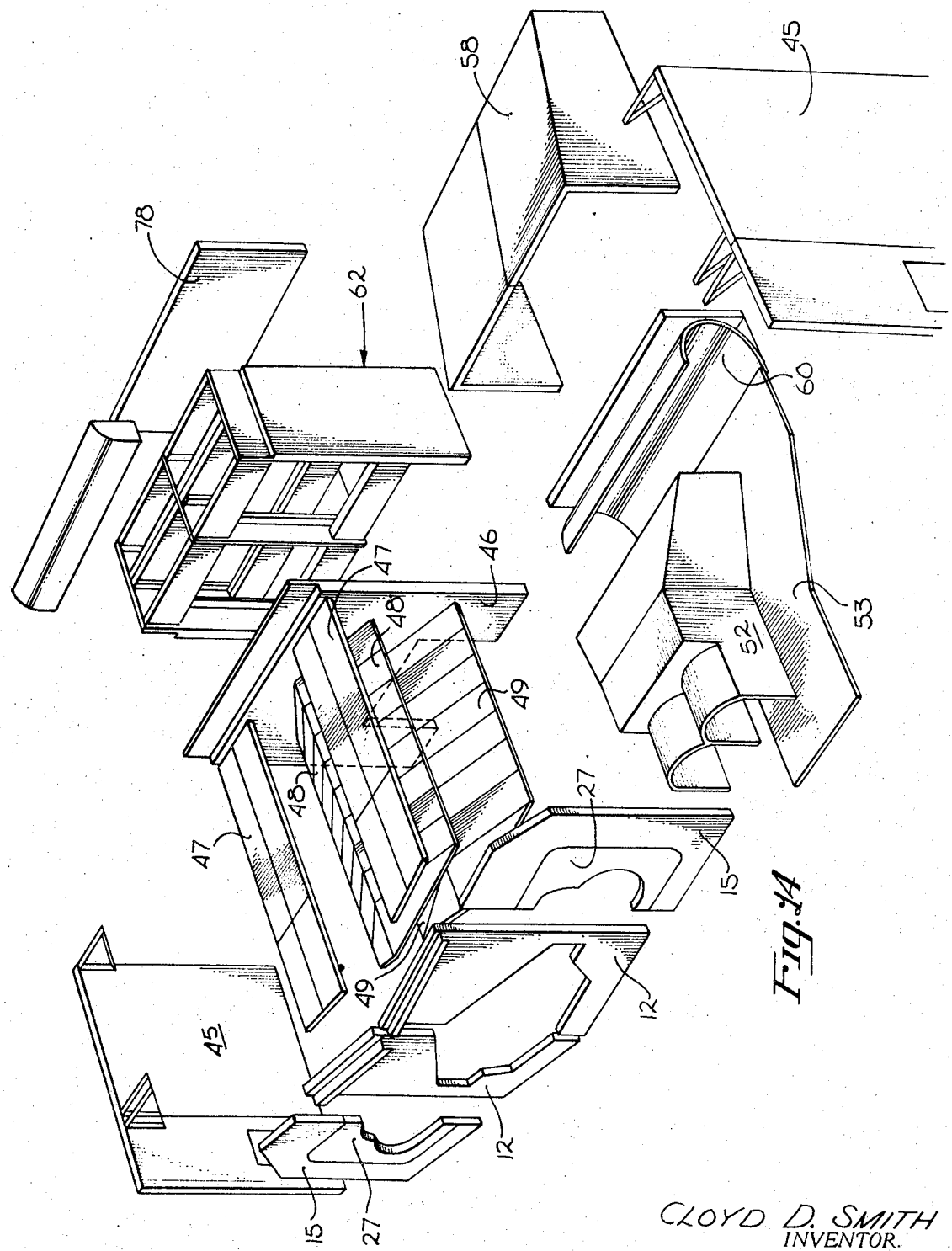

NOISE SUPPRESSOR SYSTEM

BACKGROUND OF THE INVENTION

The present invention relates generally to means for absorbing quickly the energy contained in a high-velocity stream of gases exhausted by the jet engine on an airplane, in order to reduce the sound produced thereby; and is more particularly concerned with a structure designed to absorb the noise and energy contained in the exhaust gases while the jet engine remains in the aircraft.

Reactive propulsion engines, of which the modern aircraft jet engine is an example, produce a very large amount of noise, both at intake and exhaust, as a result of the high velocities at which the intake air or exhaust gases are moving. Because of the high intensity of the noise produced by these engines, the noise has a definitely injurious physiological effect on nearby personnel, particularly if they are exposed to the high-level noise for any length of time.

Of course, the problem goes beyond injury to workmen nearby and includes the nuisance created over a relatively large area by jet engine noise. This applies particularly to workmen in the larger area and residents in areas surrounding airports, aircraft plants, and the like. As a consequence it has become necessary to suppress the noise produced by engines of this class to protect personnel and to eliminate an objectionable nuisance to people in the vicinity.

Reduction to a tolerable level of the noise produced by an engine can be accomplished by absorbing the sonic energy. More particularly, this is accomplished by reducing as rapidly as possible the energy content of the exhaust stream so that when the exhaust gases are discharged into the atmosphere they are moving at a greatly reduced velocity and energy content. Initial cooling of the exhaust stream is accomplished in part by the addition of secondary air to the exhaust stream. Additional cooling and energy absorption is accomplished by spraying water directly into the stream of exhaust gases. A system for accomplishing this cooling embodies an enclosure into which the stream of exhaust gases is directed. Heretofore it has been the usual practice to bring the exhaust or tailpipe of the engine up to the enclosure so that the engine itself is outside the enclosure, as typified by U.S. Pat. No. 2,940,537. It has been found that a substantial reduction in sound level can be achieved by placing the aft portion of the engine itself within the enclosure; and this in turn means placing a portion of the aircraft within the enclosure, a situation which is especially feasible when the engines themselves are mounted on the rear of the fuselage, but is also possible, with suitable modification of the enclosure walls, when the engines are in nacelles or other places susceptible to enclosing at least a portion of the aircraft and the engine in the suppressor enclosure.

Thus, it becomes a general object of the present invention to devise a novel means for the more effective suppression of noise from the exhaust of a jet engine or the like.

More particularly, it is an object of the present invention to provide a noise suppression system designed to enclose at least a rear portion of jet engine itself and adjacent portions of the aircraft so that the suppressor enclosure walls are brought into contact with the aircraft body or wing. This contact is with the fuselage of the aircraft forwardly of the engines when the engines are mounted aft.

BRIEF SUMMARY OF THE INVENTION

The above as well as other objects and advantages of the present invention are achieved in a noise suppressor system applicable to jet engines on aircraft. In a preferred embodiment of the invention applicable to an engine mounted at the rear of an aircraft fuselage, an enclosure defines a chamber for receiving exhaust gases from the jet engine, the enclosure including door means movably mounted on and closing one wall of the enclosure and including sealing means shaped to conform to the aircraft fuselage, such sealing means being engageable with the aircraft fuselage between the wings and the tail structure of the aircraft. This arrangement permits at least the rear portion of the engine or engines and an adjacent portion of the aircraft to be placed within the enclosure. The door means receiving the aircraft comprises symmetrical main panels which are slidably mounted to spread apart to receive the aircraft into the suppressor and also include subpanels which are relatively movable with respect to the main panels in order to accommodate the door means to the irregular shape of the aircraft fuselage.

BRIEF DESCRIPTION OF THE DRAWING

The invention will be more fully understood by reference to the following description and to the annexed drawing, in which:

FIG. 1 is a plan view of a sound suppressor system embodying the present invention illustrating application of the suppressor to a typical aircraft;

FIG. 2 is a side elevation of the structure shown in FIG. 1;

FIG. 3 is a combined side elevation and vertical section at a larger scale through the sound suppressor system;

FIG. 6 is a horizontal section taken substantially on line 6—6 of FIG. 3;

FIG. 6A is an enlarged fragmentary plan of a section of sidewall of the inlet duct;

FIG. 9 is a fragmentary vertical section taken on line 9—9 of FIG. 7;

FIG. 10 is a fragmentary vertical section taken on line 10—10 of FIG. 7;

FIG. 11 is a fragmentary plan and horizontal section on line 11—11 of FIG. 10;

FIG. 12 is a fragmentary front elevation taken on line 12—12 of FIG. 10;

FIG. 13 is a fragmentary section through a portion of an energy-absorbing panel; and FIG. 14 is an exploded perspective view illustrating the major modular components of the enclosure constituting the present sound suppressor.

DESCRIPTION OF A PREFERRED EMBODIMENT

Figure 4:
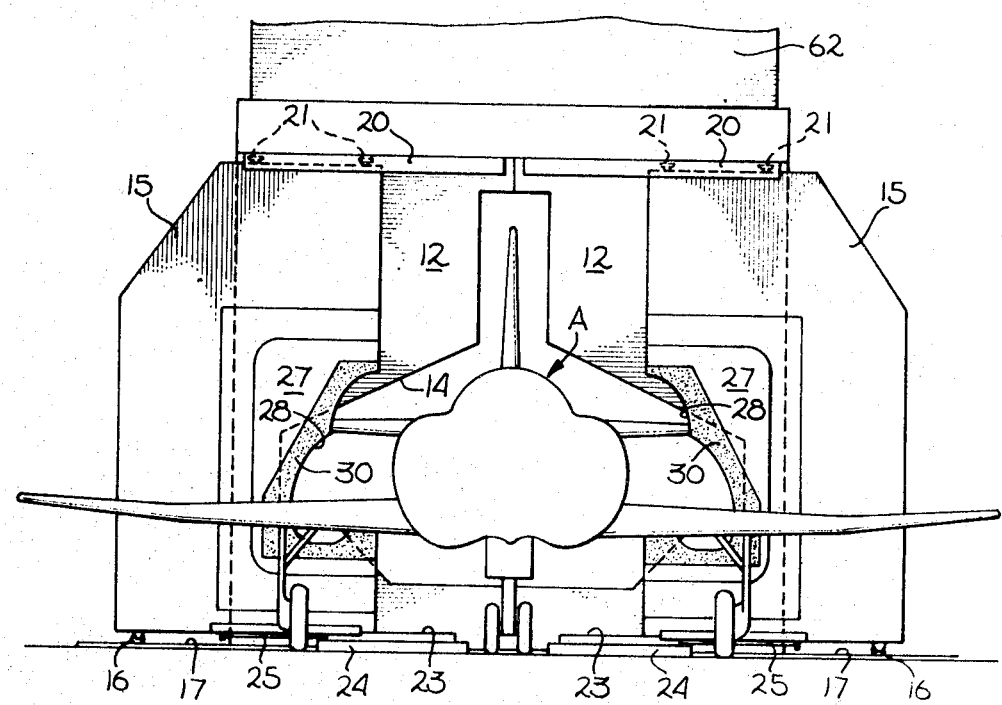
FIG. 4 is a front elevation of the sound suppressor enclosure with the subpanels on the doors spread apart.

Referring now to the drawing, and more particularly FIGS. 1 and 2, there is shown therein a jet powered aircraft A which is in position with its rear-mounted jet engines partially within the exhaust noise suppressor. Generally speaking, a noise suppressor system comprises two main units: an inlet silencer at the air intake openings, and an exhaust silencer which receives the exhaust gases for absorption of the energy therein. The inlet silencer is shown in outline only in the drawings since it may be of any known type, one example being shown in U.S. Pat. No. 2,940,537, issued June 14, 1960.

The suppressor indicated generally at 10 is an enclosure defining a chamber receiving exhaust gases from the jet engines mounted at the rear end of aircraft A. Instead of having a relatively small opening into the suppressor enclosure to receive only the tailpipe of an engine, the present enclosure is designed to receive a rear portion of the aircraft containing one or more engines. In order to receive this portion of the aircraft within the enclosure, the enclosure is provided with door means movably mounted on one wall 12 of enclosure 10, that wall for convenience of reference being termed herein as the "front wall."

As may be seen particularly in FIG. 4, front wall 12 is a fixed wall having an opening therein, the shape of which is determined by the size and profile of the aircraft. This opening 14 in the front wall is designed to receive the rear end of the aircraft with some clearance so that there is no danger of damage to the surfaces of the aircraft as it is moved into and out of the suppressor enclosure through opening 14.

In order to close the opening 14, there is slidably mounted on front wall 12 a pair of symmetrical panels 15. As may be seen in FIGS. 7 and 10, each door panel 15 is supported upon a pair of rollers 16, which are preferably grooved. Rollers 16 then ride upon angular track 17 which not only supports the weight of panel 15 but guides the panel as it moves along the track. The upper end of each panel 15 is held within channel guide 20 (FIG. 9) and carries roller 21 which bears against the outer face of wall 12. Although door panels 15 can be manually moved along track 17, it is preferable for safety purposes to provide for each one an air cylinder 23 fastened in any suitable manner to base member 24. A piston within the cylinder is moved back and forth as desired by air under pressure admitted into the cylinder, connections for this purpose not being shown on the drawings, since same may be of any well-known type, and the movement of the piston is transmitted to the door panel by piston rod 25 projecting outwardly from one end of the cylinder and connected to the door panel.

Figure 7:
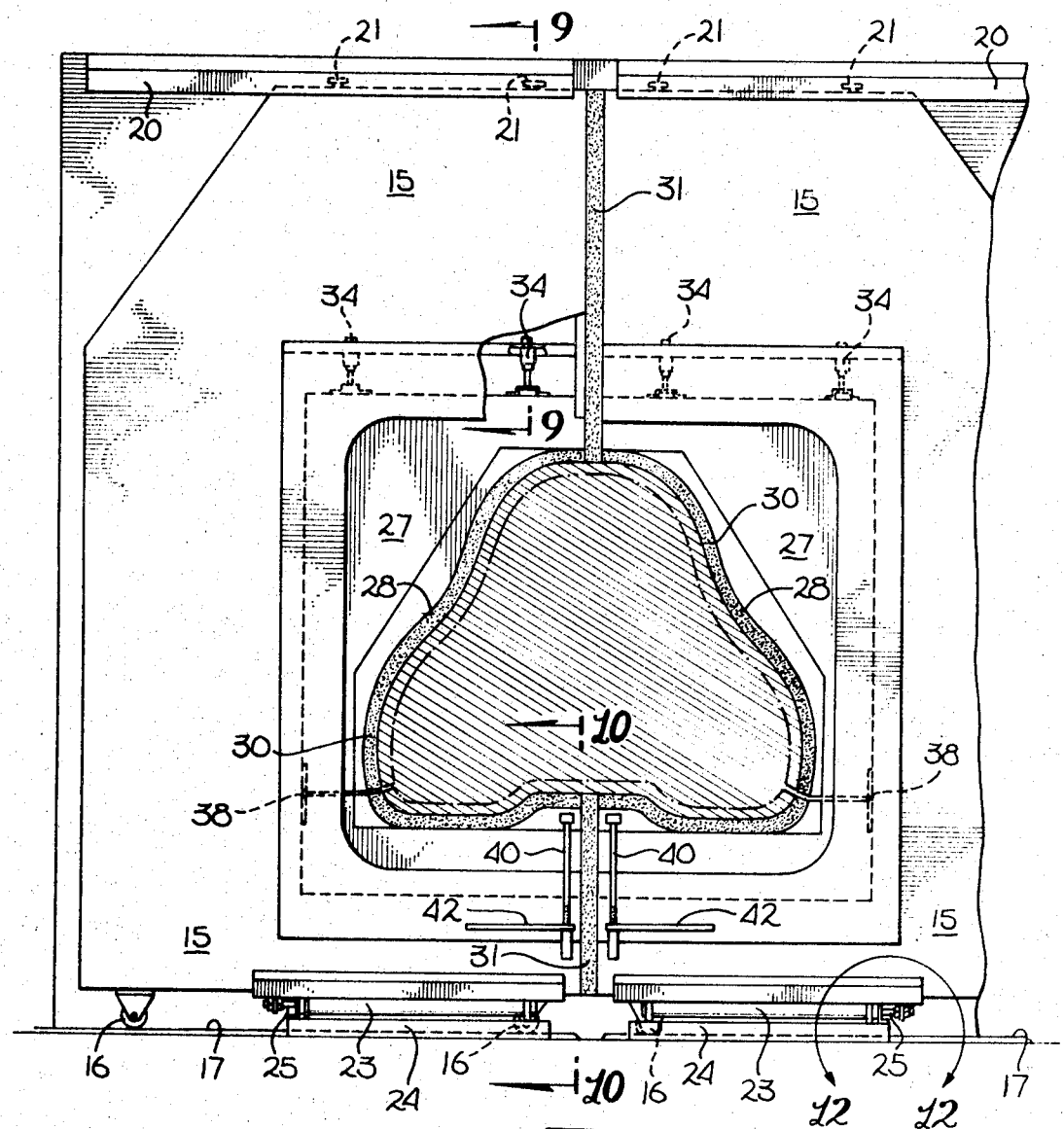
FIG. 7 is a front elevation, similar to FIG. 4, but with the doors and the subpanels thereon in closed position.

As shown in FIG. 7, each door panel 15 has mounted on it a subpanel 27. Opposing inner edges of the subpanel are contoured to fit closely to the contour of the aircraft fuselage at the point of normal engagement therewith by the subpanel. This point is rearwardly of the wings and places in the enclosure a substantial portion of the jet engines at the rear thereof, as well as adjacent portions of the aircraft. This contoured edge 28 of each subpanel carries a resilient sealing member 30 which, when the two subpanels are brought together, as shown in FIG. 7, engages the fuselage of the aircraft with an airtight relation. The resiliency of this sealing member 30 not only allows for minor variations in the shape or size of the aircraft at the point of engagement, but effects a seal with the fuselage that prevents loss of sound or energy from the suppressor at this point.

It is also preferable to apply a resilient sealing member 31 to meeting vertical edges of door panels 15 for the same reasons.

Subpanels 27 are each suspended from the associated primary door panel 15 by spring hangers 34 which permit the subpanel to shift a small amount in any direction to adjust the subpanel to the position or size of the aircraft. This eliminates the need for adjusting movement of the same character by the entire main panel 15. As shown in FIG. 9, each of the subpanels is preferably confined between a pair of plates forming the sides of the main door panel 15, the clearance between the side plates and the subpanel being substantially closed by glide bars 35 which are preferably made from some synthetic material having a low coefficient of friction in order to avoid the necessity of lubricating the members where they engage each other.

As seen in FIG. 7, in some aircraft the fuselage is of such shape that the central portion of the underside is higher than portions spaced away from the center. In order to accommodate subpanels 27 to this situation, each subpanel is provided with a lower, relatively movable section 27a, as shown particularly in FIG. 8. Although other types of interconnection between the upper and lower portions of the subpanels may be provided, a typical arrangement is to connect the lower section 27a to the upper section by a hinge 38, thus allowing the lower section to swing downwardly and away from the center of the aircraft.

Figure 8:
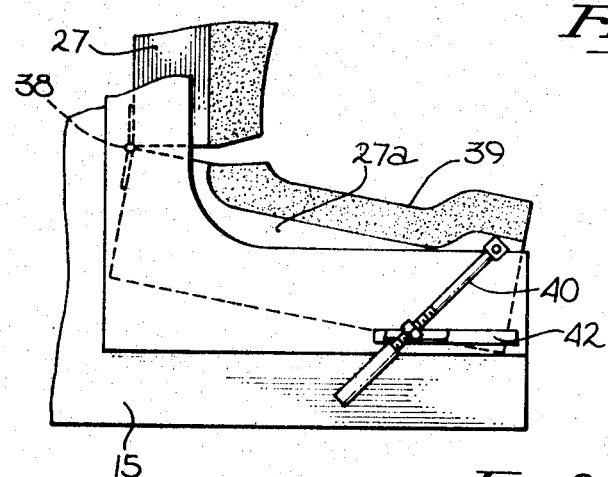
FIG. 8 is a fragmentary elevation of a portion of the subpanel structure.

Thus, each lower section 27a of the subpanel has an upwardly concave upper edge 39 which is contoured to fit a portion of the undersurface of the aircraft fuselage when raised into engagement therewith as shown in FIG. 7. When the panel is lowered, as shown in FIG. 8, then the subpanels can move laterally with main panels 15 to the open position of FIG. 4 without interference from lower side portions of the fuselage.

Although any suitable means may be provided for moving the lower section 27a toward and away from the aircraft, a simple and effective means is the hinge 38 combined with a manually operated lift rod 40. This rod is pivotally connected at 41 at its upper end to the subpanel while its lower end passes through the slot in guide 42. When a lift rod is moved to the vertical position, as shown in FIG. 7, the lower section of the subpanel is raised; but by manually swinging the lift rod to the angular position of FIG. 8, the subpanel section is allowed to drop away from the aircraft for the purposes just mentioned. A section of rod 40 may be threaded and provided with nut 43 as a means for adjusting the amount of upward movement imparted to the lower section 27a by the movement of the lift rod.

The portion of the aircraft inwardly of doors 15 is within the secondary air duct. The front wall 12 of the enclosure is one sidewall of the secondary air duct so that the door means on the wall closes the openings in that wall. The other walls defining the secondary air duct are portions 45 of the opposite sidewalls of the enclosure and interior wall 46 which becomes the rear wall of the secondary air duct. As shown in FIG. 6, the secondary air duct is open at its upper end 47 and thereby provides an inlet for secondary air above the control surfaces at the tail end of the aircraft.

In order to reduce the energy loss through this open end of the secondary air duct, baffles 48 and 49 are arranged within the air duct in staggered formation to force the air coming in to follow a zigzag path. Yet sound cannot pass directly up the air duct; instead the energy is absorbed in part as the sound impinges on the baffles. At the base of the secondary air duct, this incoming air is introduced directly into the exhaust stream issuing from the tailpipes of the aircraft engines. This secondary air mingles with and cools the exhaust gases.

Figure 5:
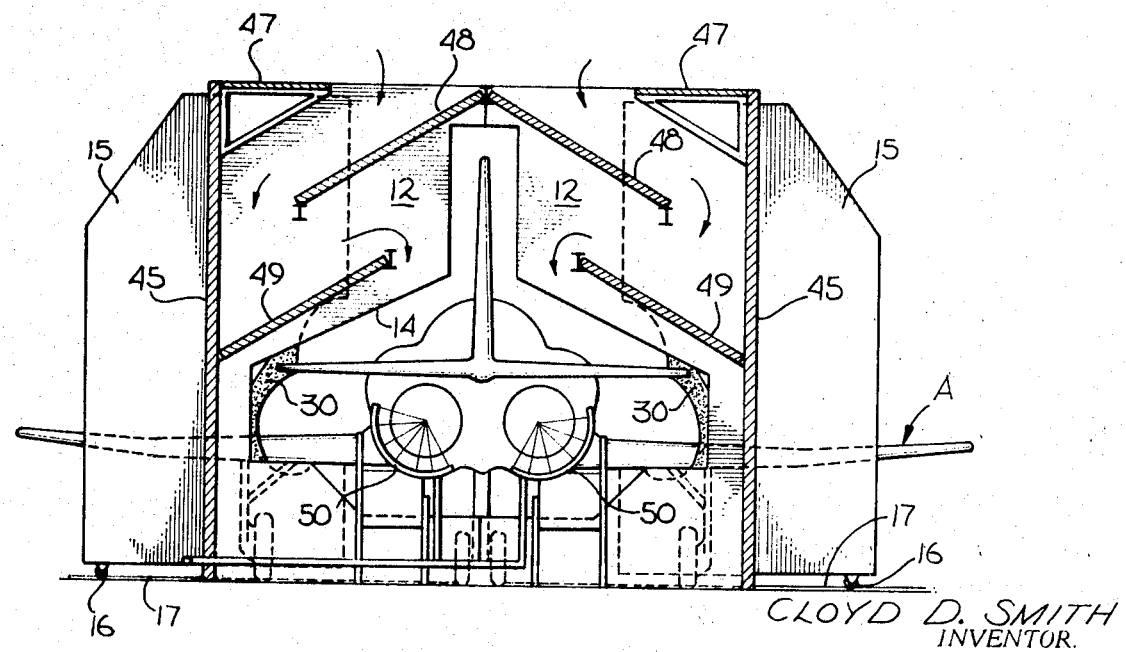
FIG. 5 is a vertical transverse section on line 5—5 of FIG. 3.

Located a short distance away from these tailpipes are primary water sprays 50. Assuming that there are a pair of engines in the tail of the aircraft, there are two water sprays 50, each designed to inject water directly into the exhaust stream to effect cooling by evaporation of the water. Although not so limited, the pipe supplying the water to the sprays preferably positions them in an arcuate configuration as shown in FIG. 5, just outside the main exhaust stream.

After passing water sprays 50, the exhaust gas stream enters augmentor tube 52. In order to take care of twin-mounted engines, a pair of similar augmentor 52 is provided as shown in FIG. 6. The augmentor tubes are not of uniform cross section, and rather are of increasing cross section in the direction of gas flow to reduce gas velocity. Augmentor 52 may be a complete one-piece tube with one or two passages for one or two engines (two being shown here), but in the construction illustrated the augmentor has a flat floor 53 under both passages that can be a separate member. This acts as an insulator and replaceable wear plate on top of the foundation.

Located within each augmentor 52 is a pipe assembly 54 which provides a secondary system of sprays for introducing additional cooling water into the exhaust stream. While the assemblies 54 may take other shapes or configurations, the ones illustrated herein comprise a plurality of headers 55 supplying water to a plurality of annular or rectangularly shaped spray pipes 56. By this time the exhaust gases have been cooled sufficiently that the gas stream may pass directly over the pipe elements of spray assembly 54.

After leaving augmentor tube 52, the exhaust gas stream impinges upon baffle 60 which effects a 180° change in direction of the exhaust gases. Baffle 60 is overlapped by floor plate 53. The gas stream then flows forwardly above a portion of augmentor 52 and under inclined roof section 58 of the enclosure, to the base of stack 62. Finally, the cooled gases leave the noise suppressor flowing upwardly through exhaust stack 62.

Exhaust stack 62 is typically rectangular in cross section and has within it a plurality of vertically extending baffle supports 64. Between pairs of supports 64 are located baffles 65 in a staggered pattern such that the rising exhaust gas stream must follow a zigzag pattern while the baffles themselves operate to absorb energy from the exhaust stream and thereby reduce the amount of noise produced by the gases issuing upwardly from the upper end of stack 62.

Since the exhaust from at least one, and sometimes two, jet engines is directed into enclosure 10 at the base of the secondary air inlet, it will be realized that in this chamber an enormous amount of energy is released, and consequently the walls 12, 45, and 46 of this chamber are subjected to very severe vibration. An advantageous construction for these walls is illustrated in FIGS. 6A and 13 which illustrate respectively a section of the wall and of the individual panels incorporated into the walls.

Referring to FIG. 6A, it will be seen that the sidewalls 45, which are typical also of front wall 12 and rear wall 46, are constructed with a plurality of spaced columns 68 which may be constructed in any suitable manner from structural shapes, such as angles, channels, I-beams, and the like. Attached to the outer side of columns 68 are face plates 69 which are heavy metal plates. Spaced inwardly from face plates 69 are energy-absorbing panels 70 which are removably installed in these walls. Columns 68 may have attached to them angles 71 which cooperate with other flanges on the columns to provide vertical guide ways into which the individual panels 70 can slide, the panels having a horizontal width equal to the dimensions between columns 68.

The construction of a panel 70 is illustrated in greater detail in FIG. 3. Each panel has a frame member 72 around the perimeter of the panel. In the sidewalls 45 and rear wall 46, these frame members are rectangular in outline; but in the front wall 12, the panels necessarily have shapes other than rectangular. Attached to the back or outer side of frame 62 is a solid metal sheet 73. On the opposite or front side of the panel and attached to frame member 72 around its edges is a corrugated metal sheet 74 which is perforated in order to allow the sound waves to pass through the sheet into the interior of panel 70 for attenuation therein. Immediately behind corrugated sheet 74 is a woven blanket of fiber glass or similar material which is adapted to withstand high temperatures. The interior of the panel between the blanket 75 and plate 73 is filled with a mass 76 of loose fibrous materials, such as rock wool, fiber glass, or other strong fibrous materials adapted to withstand the temperatures encountered. This material is packed at a density of from 4 to 6 pounds per cubic foot and serves as the main energy-absorbing element of the panel.

The corrugations in panel 70 are preferably horizontal, when this is the shorter dimension of each panel, as this direction then lends greater stiffness to the front panel against which the sound waves initially impinge. It has been found that under this very heavy duty, a flat sheet on the inside face of the panel 70 vibrates so severely that in a comparatively short time it fails from fatigue, whereas the corrugated panel has greater stiffness and a life several times greater than the flat sheet.

Another advantage of the corrugated panel is that it offers a great total surface area so that more perforations or a larger total perforated area can be provided in sheet 74 than if the sheet were flat, without weakening the sheet. Also, there is a better diffusion of reflected sound waves from the wavy surface than from a flat or planar surface.

These panels are not load-bearing members, since the weight of the structure is supported by the frame including columns 68 and face plates 69. Instead, the panels can easily be removed if necessary for replacement.

An advantage of the enclosure constructed as described is that a better and more effective seal against sound losses is made with the aircraft than when the engine tailpipe is merely brought into close proximity to the augmentor tube or some type of cuff is provided at this point. The seal between the interior of the enclosure and the surrounding atmosphere is made by the resilient member 30 engaging the aircraft. At the point of engagement, the aircraft is cooler than is the tailpipe so that a resilient sealing member can be used which is not subjected to the high temperatures encountered at the tailpipe of the jet. Since at least a portion of the engine is also introduced into the enclosure of the suppressor, there is less sound loss by way of transmission through the body of the aircraft to the open atmosphere. For this reason, engagement of the seal with the aircraft, whether it be at the fuselage or any other portion thereof, is advantageous and should include as much of the engine structure as is practical. In operation the structure illustrated has been found to increase the sound suppression or the energy absorption of the system by a matter of some 10 to 15 decibels, which is a substantial increase in the efficiency of the suppressor system.

The suppressor enclosure described above has been designed to rest upon a prepared foundation which provides the floor underneath the suppressor. The enclosure is then constructed to comprise a plurality of major segments or modules that rest upon this prepared foundation and which by their nature can be detached from one another and removed from one site to another, if necessary.

These modules are shown in FIG. 14, which is an exploded perspective illustrating the major components of the suppressor. Thus the two door sections 12, sidewalls 45, and rear wall 46 make up the walls defining the secondary air inlet chamber. Within this chamber are the baffles 48 and 49, and below them augmentor 52. A floor plate 53 may be provided in connection with augmentor 52, this floor plate being connected to the semicircular deflector 60 which reverses the direction of gas flow. The deflector 60 is enclosed within a portion of the enclosure defined by roof section 58 and rear wall panel 78. Underneath roof panel 58, the gases flow to the base of exhaust stack 62 which can be constructed as a single unit including baffles 65 and their supports 64. The exhaust stack is closed on one side by wall 46 which is a common wall between the exhaust stack and the secondary air inlet. By constructing the enclosure in a plurality of major modules which can be easily assembled and disassembled, not only is initial erection at a site simplified, but greater utility is afforded the enclosure since it can be taken apart and reerected at another site with comparative ease.

From the foregoing disclosure of the present invention, it will be apparent that further detailed description and various modifications and changes may be made in it without departing from the spirit and scope of the invention. For example, the enclosure can be modified to effect an airtight sealing relationship between some other portion of the aircraft, such as the wing structure and/or engine housings, in order to adapt the suppressor enclosure to engines mounted in nacelles. Again, the sealing relationship between the enclosure and the aircraft takes place at a position on the aircraft such that at least a rear portion of the engine being tested and adjacent portions of the aircraft are received within the enclosure. All such modifications of the construction of the enclosure are deemed to fall within the scope of the present invention.

I claim:

1. A noise suppressor system for a jet aircraft which has an aft, rearward projection that includes a jet engine and tailpipe, comprising:
    a noise suppressor chamber with a front wall having a door opening therein for receiving into said chamber at least a portion of said projection so that said exhaust gases from said tailpipe are discharged inside said chamber inwardly of said door opening;
    opposed main door panels slidably adjacent said front wall of the suppressor chamber, said doors being slidable apart to receive between them through said opening, and into said chamber, said portion of said projection, and thereafter to close thereabout; and
    opposed subpanels movably mounted on said main panels on opposite sides of said aircraft projection for movement relatively to said main panels, opposed edges of said subpanels being contoured to fit closely and acoustically seal to said aircraft projection, said subpanels being arranged to effect an acoustic seal also with said main panels.

2. The noise suppressor system according to claim 1, wherein said main door panels are movable in horizontal directions, and said subpanels are movable vertically relative to said main panels.

3. The noise suppressor system according to claim 1, wherein said main door panels are movable in horizontal directions, and said subpanels are movable horizontally relative to said main panels.

4. The subject matter of claim 1, including yieldable spring supports for said subpanels on said main door panels, enabling accommodation movement of said subpanels relative to said main panels.

5. The subject matter of claim 1, wherein said main door panels are movable in horizontal directions, and spring means yieldingly mounting said subpanels on said main panels for relative accommodation movements of said subpanels in both horizontal and vertical directions.

6. A noise suppressor system as in claim 1 in which the doors comprise:
   a pair of main door panels slidably mounted adjacent said front chamber wall for movement horizontally together and apart, said panels when brought together defining an opening through the panels receiving said rearwardly directed portion of the aircraft with clearance; and
   a subpanel mounted on each of said main panels for free adjustment movement thereon, the subpanels cooperating to close said clearance between the main panels, and each of said subpanels having a sealing member conforming in shape to the outline of said rearward aircraft projection at the location of engagement therewith and engageable therewith in substantially acoustically sealed relation.

7. A noise suppressor system as in claim 6, wherein:
   said main door panels are movable horizontally, and said subpanels are movable vertically relative to said main panels, and spring means yieldingly suspending each subpanel on a main door panel for limited adjusting movement relative thereto.

8. A noise suppressor system as in claim 6, in which each subpanel includes a lower section and an upper section hingedly interconnected for relative swinging movement.

9. A noise suppressor system as in claim 6, in which each subpanel comprises two relatively movable sections of which one section has an upwardly concave upper edge contoured to conform to a portion of the aircraft surface, and means moving said one section relative to the other section in a direction toward and away from the aircraft.

10. The noise suppressor according to claim 1, wherein said main door panels are horizontally movable toward and from one another, each of said horizontal door panels comprising a double-walled, three-sided frame, with a space between said walls, each of said subpanels also comprising a three-sided frame, and being received with relatively close but moving fit in the space between said walls of said main panels, and including tension springs yieldingly suspending each of said subpanels from the upper portion of the corresponding main panel.

* * * * *